(12) United States Patent
Sawai et al.

(10) Patent No.: US 11,359,768 B2
(45) Date of Patent: *Jun. 14, 2022

(54) PRESSURE VESSEL (71) Applicant: TOYOTA JIDOSHA KABUSHIKI KAISHA, Aichi-ken (JP)

(72) Inventors: Osamu Sawai, Okazaki (JP); Tomoki Nakashima, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,766

(22) Filed: Jul. 30, 2020

(65) Prior Publication Data

US 2021/0140588 A1    May 13, 2021

(30) Foreign Application Priority Data

Nov. 7, 2019 (JP) .............................. JP2019-202659

(51) Int. Cl.
*F17C 13/06* (2006.01)

(52) U.S. Cl.
CPC ...... *F17C 13/06* (2013.01); *F17C 2201/0109* (2013.01); *F17C 2203/0604* (2013.01); *F17C 2203/0619* (2013.01); *F17C 2203/0675* (2013.01); *F17C 2205/0311* (2013.01); *F17C 2221/012* (2013.01); *F17C 2270/0184* (2013.01)

(58) Field of Classification Search
CPC ......... B29D 22/003; F16J 12/00; F17C 13/06; F17C 2201/0109; F17C 2203/0604; F17C 2203/0619; F17C 2203/0675; F17C 2205/0311; F17C 2221/012; F17C 2270/0184; F17C 2205/0305

See application file for complete search history.

(56) References Cited

U.S. PATENT DOCUMENTS 8,925,756 B2   1/2015  Tarapata et al.
10,753,474 B2  8/2020  Moutray et al.
(Continued)

FOREIGN PATENT DOCUMENTS

JP   2000291887 A   10/2000
JP   2018112204 A    7/2018

OTHER PUBLICATIONS

Office Action in U.S. Appl. No. 16/732,569, dated Feb. 23, 2022, 16pp.

*Primary Examiner* — Shawn M Braden
(74) *Attorney, Agent, or Firm* — Hauptman Ham, LLP (57) ABSTRACT

A pressure vessel includes a vessel body, a covering part, and a cylindrical mouthpiece. The vessel body includes a cylindrical open end portion on at least one end side of the vessel body. The covering part is made of a fiber reinforced resin and covers an outer surface of the vessel body. The mouthpiece is configured such that a plurality of mouthpiece bodies each having a projection on an inner surface of the mouthpiece body is connected to each other in a circumferential direction of the open end portion. The mouthpiece is attached to an outer peripheral surface of the open end portion by the projections biting into the covering part covering the outer peripheral surface of the open end portion. The mouthpiece bodies of the mouthpiece are connected to each other by fitting together fitting portions formed at end portions of the mouthpiece bodies in the circumferential direction.

4 Claims, 9 Drawing Sheets

(56) References Cited

U.S. PATENT DOCUMENTS

| | | |
|---|---|---|
| 11,098,801 B2 | 8/2021 | Baumer et al. |
| 11,209,085 B2 | 12/2021 | Moutray et al. |
| 2010/0012663 A1* | 1/2010 | Andreani ................ F17C 13/06 220/582 |
| 2015/0096957 A1* | 4/2015 | Etesse ................ B29C 49/0047 215/355 |
| 2018/0087719 A1* | 3/2018 | Cola ........................ F17C 13/04 |
| 2018/0195668 A1 | 7/2018 | Sawai |
| 2019/0186693 A1 | 6/2019 | Wilder et al. |
| 2020/0217457 A1 | 7/2020 | Sawai |
| 2020/0368106 A1* | 11/2020 | Eicke ....................... A61J 1/201 |
| 2021/0102665 A1* | 4/2021 | Mahieu ..................... F17C 1/16 |
| 2021/0237367 A1* | 8/2021 | Takami ..................... F17C 1/06 |
| 2021/0239269 A1* | 8/2021 | Baumer .................. B29C 53/80 |
| 2021/0252181 A1* | 8/2021 | Griffis ....................... A61L 9/12 |
| 2021/0254787 A1* | 8/2021 | Takami ..................... F17C 1/16 |

* cited by examiner

PRESSURE VESSEL

INCORPORATION BY REFERENCE

The disclosure of Japanese Patent Application No. 2019-202659 filed on Nov. 7, 2019 including the specification, drawings and abstract is incorporated herein by reference in its entirety.

BACKGROUND

1. Technical Field

The disclosure relates to a pressure vessel.

2. Description of Related Art

Hitherto, there is known a pressure vessel that includes a cylindrical liner and a reinforcing part (reinforcing layer) made of a carbon fiber reinforced resin (CFRP) and configured to reinforce the liner, and stores hydrogen inside (see, e.g. Japanese Unexamined Patent Application Publication No. 2018-112204 (JP 2018-112204 A)). A mouthpiece is firmly attached to an open end portion of the liner of the pressure vessel. Specifically, projections of the mouthpiece bite into the reinforcing part (reinforcing layer).

SUMMARY

Figure 12:
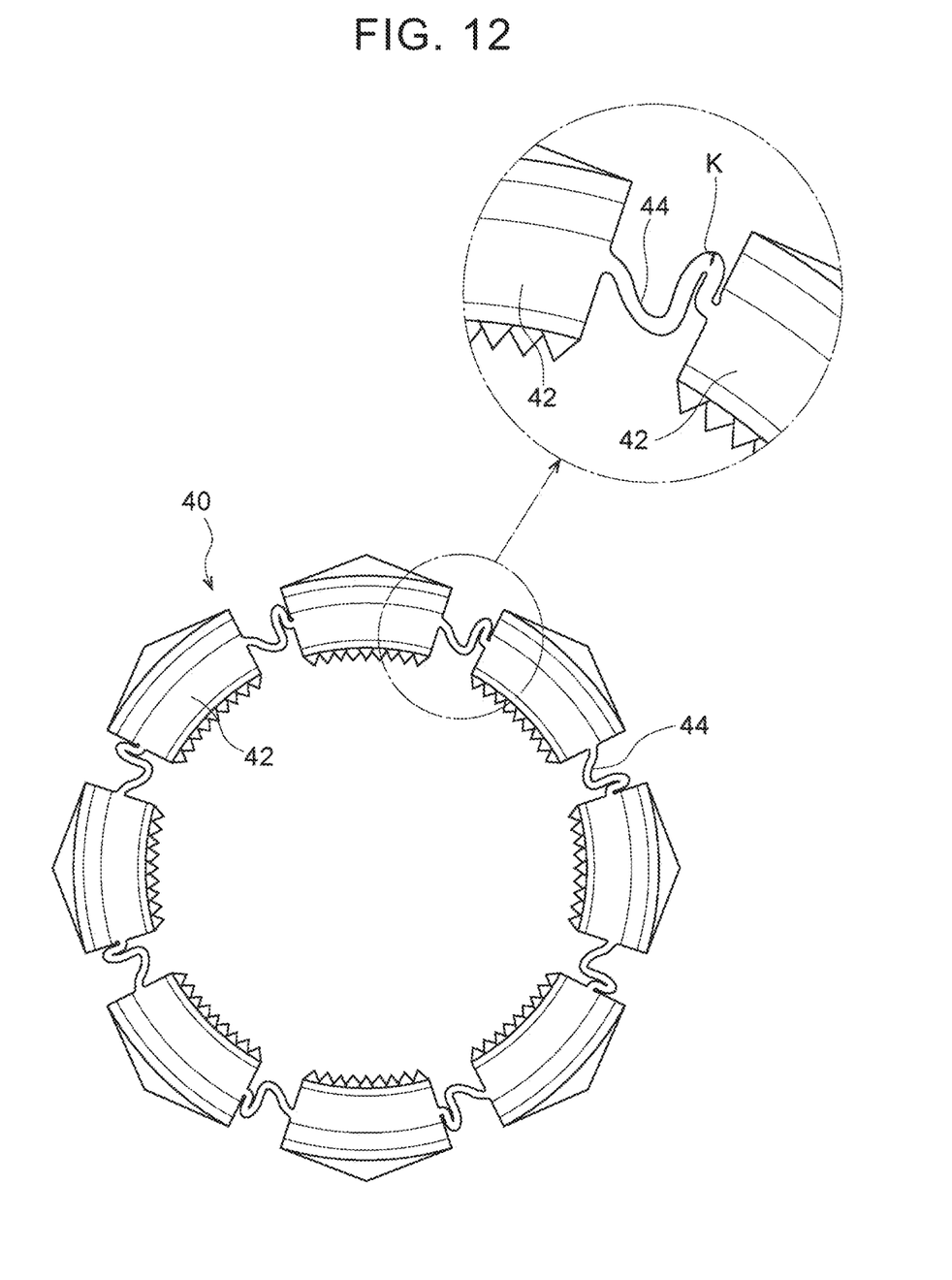
FIG. 12 is a partially enlarged front view illustrating a mouthpiece according to a comparative example.

As the structure of the mouthpiece, it is conceivable that a plurality of (e.g. eight) mouthpiece bodies are connected to each other by thin plate-like connecting parts each having its thickness direction along the radial direction and that the mouthpiece is attached to the open end portion of the liner as the vessel body by locally deforming the connecting parts (see FIG. 12). With this structure, there is an advantage that it is possible to reduce the number of components forming the mouthpiece.

However, with such a structure, there is a possibility that when attaching the mouthpiece to the open end portion of the liner by locally deforming the connecting parts, the mouthpiece bodies cannot be equally pressed radially inward due to variation of forces applied for such deformation or the like, resulting in the occurrence of a crack or the like in one or some of the connecting parts.

It is therefore an object of the disclosure to provide a pressure vessel that can prevent the occurrence of a crack or the like in a mouthpiece when attaching the mouthpiece to an open end portion of a vessel body.

A first aspect of the disclosure relates to a pressure vessel including a vessel body, a covering part, and a cylindrical mouthpiece. The vessel body includes a cylindrical open end portion on at least one end side of the vessel body and is configured to be filled with a gas. The covering part is made of a fiber reinforced resin and covers an outer surface of the vessel body. The mouthpiece is configured such that a plurality of mouthpiece bodies each having a projection on an inner surface of the mouthpiece body is connected to each other in a circumferential direction of the open end portion. The mouthpiece is attached to an outer peripheral surface of the open end portion by the projections biting into the covering part covering the outer peripheral surface of the open end portion. The mouthpiece bodies of the mouthpiece are connected to each other by fitting together fitting portions formed at end portions of the mouthpiece bodies in the circumferential direction.

According to the first aspect, the cylindrical mouthpiece attached to the outer peripheral surface of the open end portion of the vessel body by the projections biting into the covering part covering the outer peripheral surface of the open end portion is configured by connecting the mouthpiece bodies in the circumferential direction of the open end portion. The mouthpiece bodies of the mouthpiece are connected to each other by fitting together the fitting portions formed at the end portions of the mouthpiece bodies in the circumferential direction. Therefore, when attaching the mouthpiece to the vessel body, the portions connecting the mouthpiece bodies to each other are not locally deformed. Consequently, a crack or the like is prevented from occurring in the portions connecting the mouthpiece bodies to each other in the mouthpiece.

According to a second aspect of the disclosure, in the pressure vessel according to the first aspect, the fitting portion may include a recessed portion formed at a first end portion of each of the mouthpiece bodies in the circumferential direction, and a protruding portion formed at a second end portion of each of the mouthpiece bodies in the circumferential direction, and the mouthpiece bodies of the mouthpiece may be connected to each other by fitting the protruding portion of one of the adjacent mouthpiece bodies to the recessed portion of the other of the adjacent mouthpiece bodies.

According to the second aspect, the fitting portion includes the recessed portion formed at the first end portion of each of the mouthpiece bodies in the circumferential direction, and the protruding portion formed at the second end portion of each of the mouthpiece bodies in the circumferential direction, and the mouthpiece bodies of the mouthpiece are connected to each other by fitting the protruding portion of one of the adjacent mouthpiece bodies to the recessed portion of the other of the adjacent mouthpiece bodies. Therefore, the mouthpiece bodies are easily connected to each other.

According to a third aspect of the disclosure, in the pressure vessel according to the second aspect, the protruding portion may be configured to be press-fitted into the recessed portion.

According to the third aspect, the protruding portion is press-fitted into the recessed portion. Therefore, compared to a configuration having a gap between the protruding portion and the recessed portion, the sealability in the fitting portion is improved.

According to a fourth aspect of the disclosure, in the pressure vessel according to the second aspect, a bulging portion bulging at least in a radial direction of the open end portion may be formed at an end portion of the protruding portion on a downstream side in a fitting direction of the protruding portion to the recessed portion, and the bulging portion may be configured to be press-fitted into the recessed portion.

According to the fourth aspect, the bulging portion bulging at least in the radial direction of the open end portion is formed at the end portion of the protruding portion on the downstream side in the fitting direction of the protruding portion to the recessed portion and is press-fitted into the recessed portion. Therefore, compared to a configuration having a gap between the bulging portion and the recessed portion, the sealability in the fitting portion is improved.

As described above, according to the disclosure, it is possible to prevent the occurrence of a crack or the like in the mouthpiece when attaching the mouthpiece to the open end portion of the vessel body of the pressure vessel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the disclosure will be described in detail below with reference to the drawings. For convenience of description, arrow S, arrow R, and arrow C that are shown in the respective figures as appropriate respectively indicate the axial direction of a pressure vessel 10, the radial direction of the pressure vessel 10, and the circumferential direction of the pressure vessel 10. Therefore, when the axial direction, the radial direction, and the circumferential direction are used in the following description, these directions respectively indicate the axial direction, the radial direction, and the circumferential direction of the pressure vessel 10 (including later-described open end portions 14), unless specifically stated otherwise.

Figure 1:
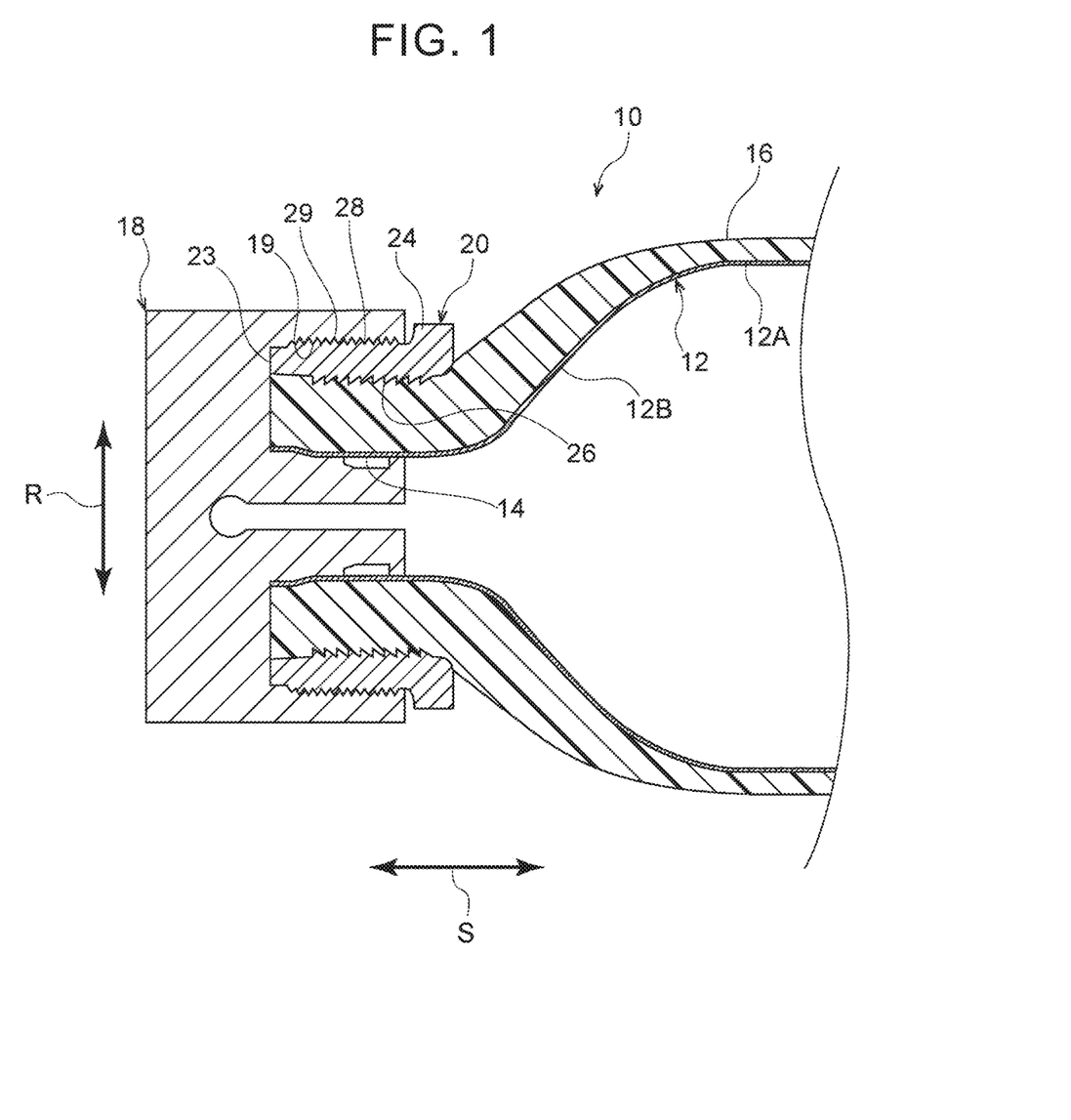
FIG. 1 is a sectional view illustrating, on an enlarged scale, the open end side of a pressure vessel according to an embodiment.

As illustrated in FIG. 1, the pressure vessel 10 according to this embodiment forms a part of a tank module (illustration omitted) mounted in a fuel cell vehicle (illustration omitted). The tank module includes a plurality of pressure vessels 10 connected to each other via later-described fastening parts 18 or the like.

The pressure vessel 10 includes a liner 12 as a vessel body to be filled with gaseous hydrogen, a reinforcing layer 16 as a covering part that covers the outer surface of the liner 12 from the outside to reinforce the liner 12, and cylindrical mouthpieces 20 each attached, via the reinforcing layer 16, to the outer peripheral surface of the cylindrical open end portion 14 formed at each of both ends of the liner 12.

The liner 12 is made of a resin material such as a polyamide synthetic resin and has a generally cylindrical shape. More specifically, the liner 12 has a cylindrical body portion 12A having a constant inner diameter and a constant outer diameter and located at an intermediate portion of the liner 12 in its longitudinal direction (axial direction), and shoulder portions 12B forming both side portions of the liner 12 in its longitudinal direction (axial direction) and each gradually narrowing toward the side away from (axially outward of) the body portion 12A.

The liner 12 has the cylindrical open end portions 14 forming both end portions of the liner 12 in its longitudinal direction (axial direction) (portions axially outward of the shoulder portions 12B) and having an inner diameter and an outer diameter that are smaller than those of the body portion 12A and the shoulder portions 12B and are approximately constant.

The reinforcing layer 16 is formed such that tapes (illustration omitted) made of a fiber reinforced resin are wound around the entire outer surface of the liner 12 in a plurality of layers. The thickness of the reinforcing layer 16 increases toward the open end portion 14 sides from the body portion 12A side of the liner 12. Further, in the reinforcing layer 16, the outer diameter (the outer diameter before the mouthpiece 20 is attached) of a portion corresponding to each of the open end portions 14 of the liner 12 is approximately constant. In this embodiment, a carbon fiber reinforced resin (CFRP) is used as one example of the fiber reinforced resin (FRP).

The mouthpieces 20 are respectively attached to the open end portions 14 of the liner 12 covered with the reinforcing layer 16, i.e. attached to the reinforcing layer 16 on the open end portions 14 of the liner 12. Further, the fastening parts 18 are respectively attached to the mouthpieces 20. With this configuration, the open end portion 14 of the liner 12 on its one side is closed by one of the fastening parts 18, and the open end portion 14 (illustration omitted) of the liner 12 on its other side is connected to another pressure vessel 10 via the other one of the fastening parts 18 (illustration omitted). In FIG. 1, the open end portion 14 of the liner 12 on the side closed by the fastening part 18 is illustrated.

First Embodiment

Next, the configuration of the mouthpiece 20 according to a first embodiment will be described.

Figure 2:
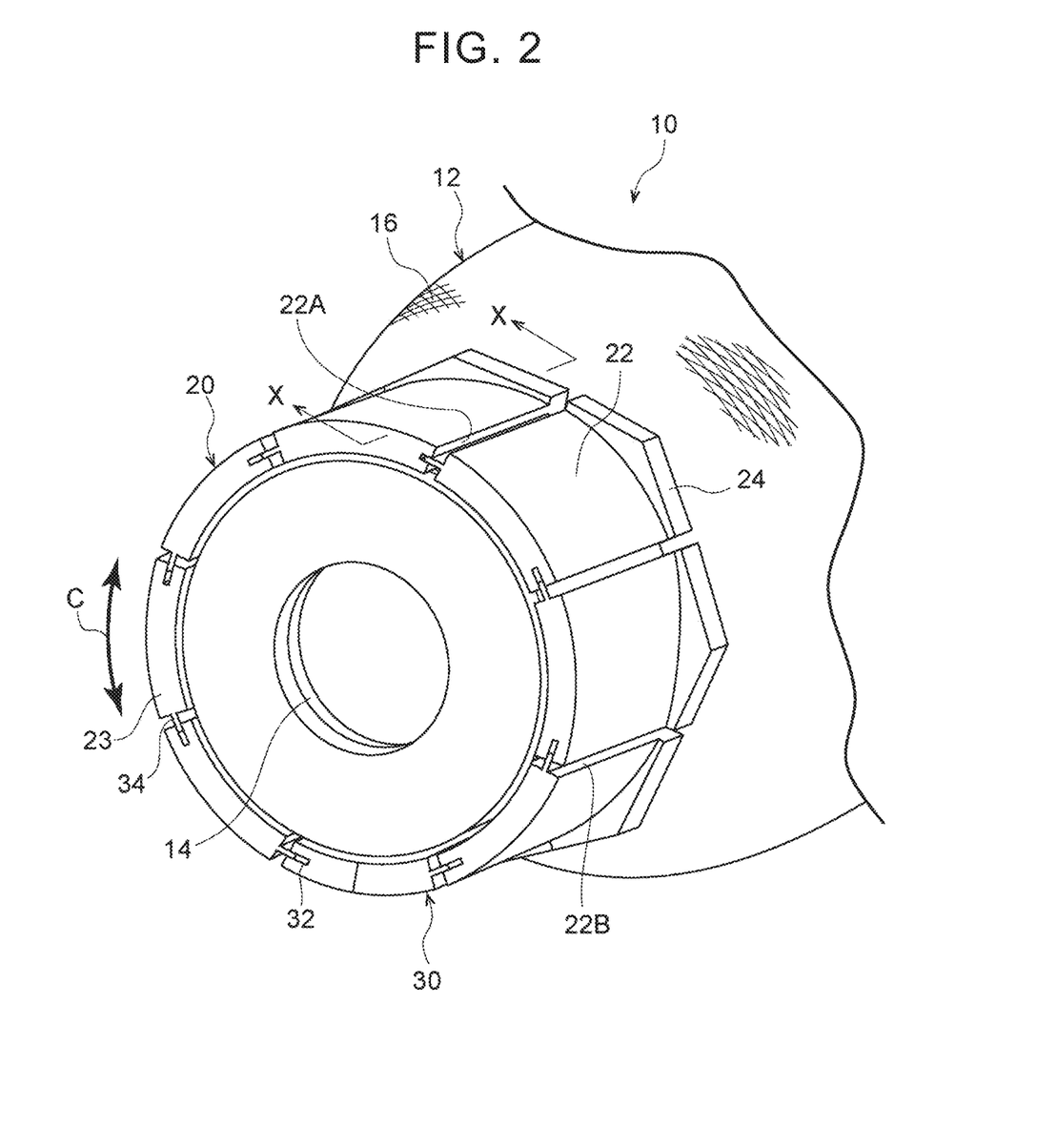
FIG. 2 is a perspective view illustrating a state before locking pawls of a mouthpiece according to a first embodiment bite into a reinforcing layer covering an open end portion of a pressure vessel.
Figure 4:
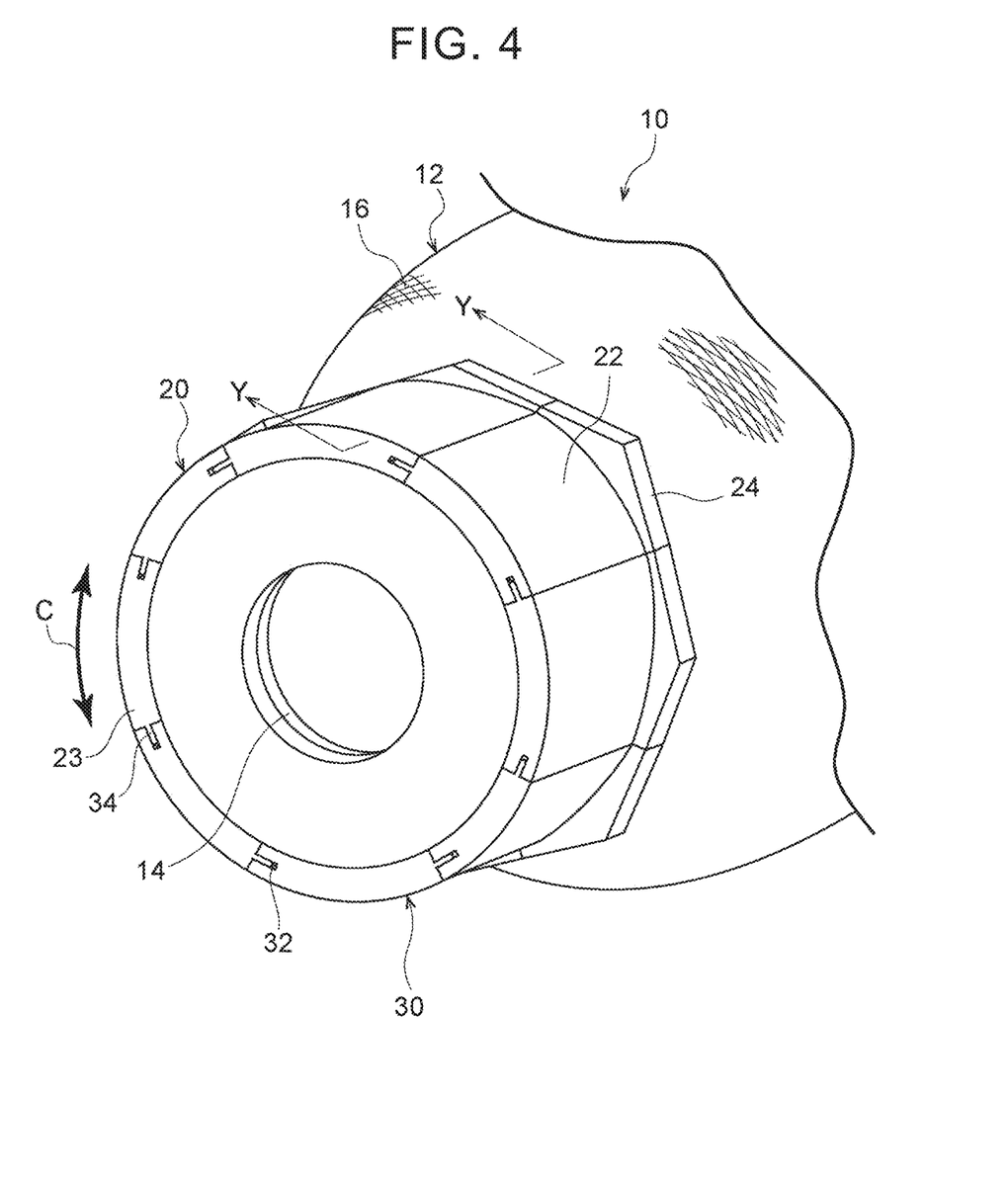
FIG. 4 is a perspective view illustrating a state after the locking pawls of the mouthpiece according to the first embodiment bite into the reinforcing layer covering the open end portion of the pressure vessel.
Figure 7:
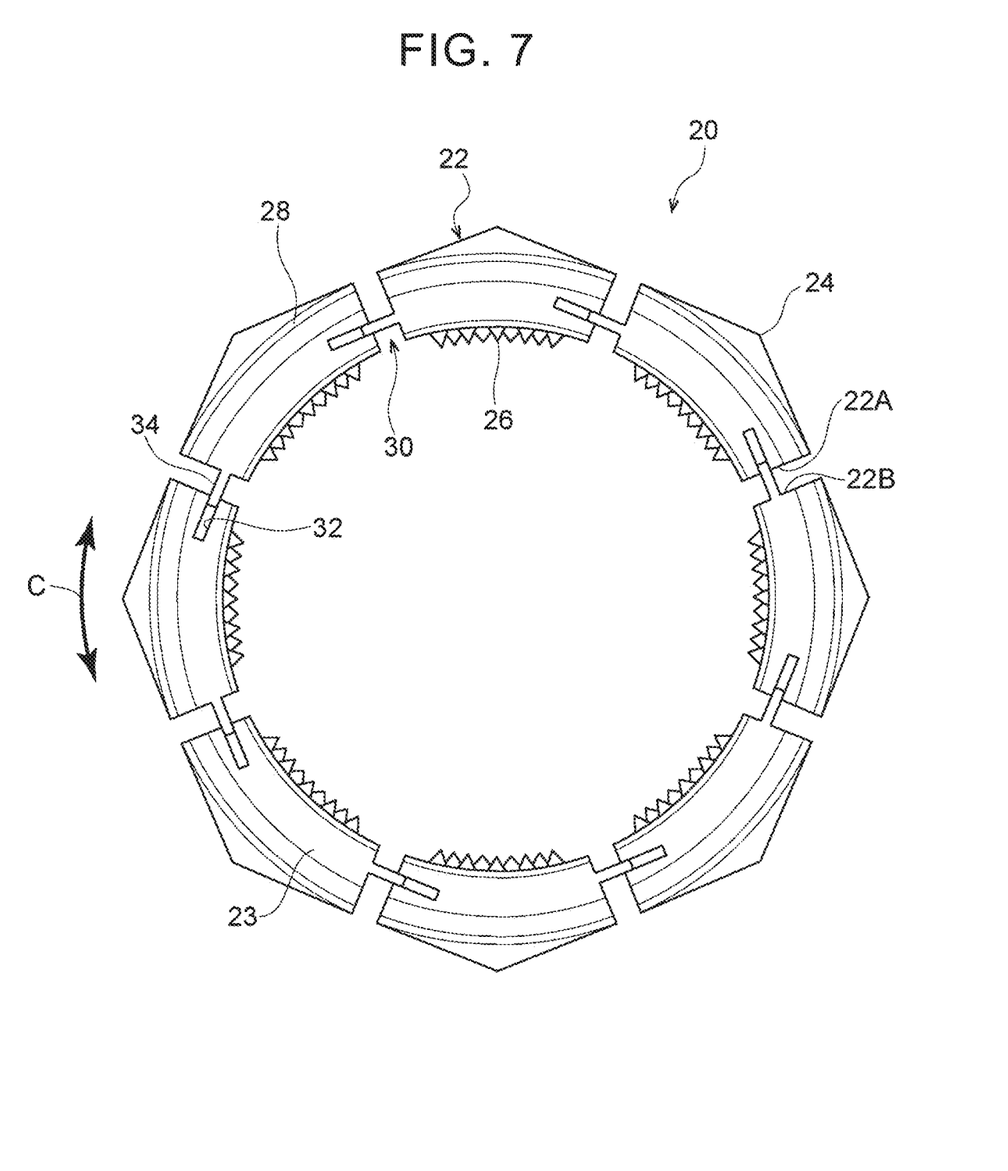
FIG. 7 is a front view illustrating the mouthpiece before fitting according to the first embodiment.

As illustrated in FIGS. 2, 4, and 7, the mouthpiece 20 is formed to a cylindrical shape using a metal material. Specifically, the mouthpiece 20 is formed by a plurality of (in this embodiment, eight) mouthpiece bodies 22 disposed in the circumferential direction. Each of the mouthpiece bodies 22 extends in the axial direction with its thickness direction along the radial direction and is formed to a plate shape that is curved radially outward as viewed from the axial direction.

An axially outward end face of each mouthpiece body 22 is a flat surface 23 that is disposed flush with an end face of the open end portion 14 (the reinforcing layer 16), and an axially inward end face of each mouthpiece body 22 is integrally formed with a flange portion 24 that is bent radially outward. The flange portion 24 is formed to a generally isosceles triangular shape with an obtuse vertical angle as viewed from the axial direction.

As illustrated in FIGS. 1, 3, 5, and 7, the inner peripheral surface (inner surface) of each mouthpiece body 22 is formed with a plurality of locking pawls 26 as projections so that the inner peripheral surface of each mouthpiece body 22 has a knurled surface with the locking pawls 26. In sectional views taken along the axial direction and the radial direction, the locking pawls 26 are formed to a saw blade shape such that the locking pawls 26 are pointed on the tip side in the projecting direction (on the radially inner side).

Figure 6:
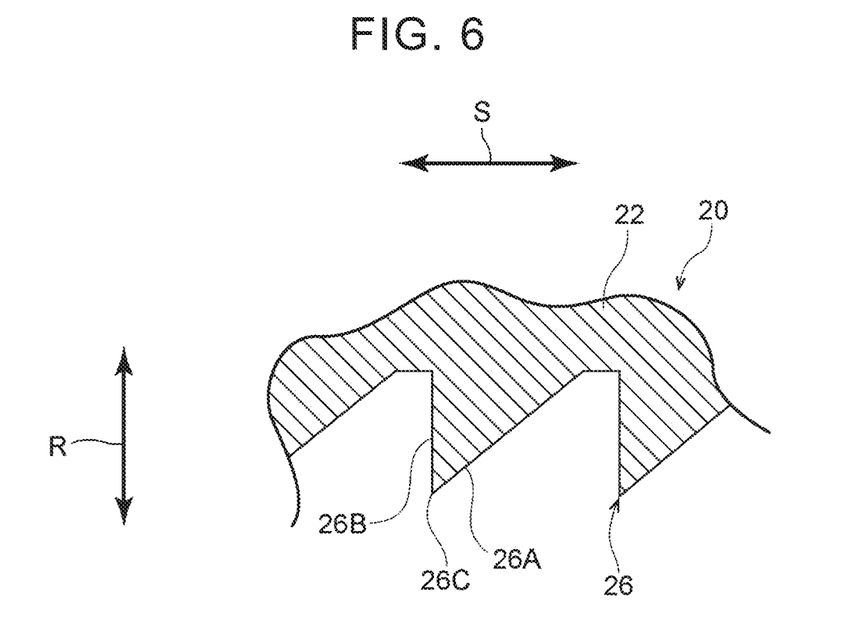
FIG. 6 is a sectional view illustrating, on an enlarged scale, the locking pawls of the mouthpiece according to the first embodiment.

More specifically, as illustrated in FIG. 6, in each of the locking pawls 26, a surface facing the body portion 12A side of the liner 12 is an inclined surface 26A that is inclined axially outward as going radially inward. Further, in each locking pawl 26, a surface on the side opposite to the surface facing the body portion 12A side of the liner 12 is a perpendicular surface 26B extending along the radial direction.

Further, a portion at which the inclined surface 26A and the perpendicular surface 26B cross each other is a tip portion 26C of the locking pawl 26. It is configured that the tip portions 26C of the locking pawls 26 bite into the outer peripheral portion of the reinforcing layer 16 covering the outer peripheral surface of the open end portion 14 so that the mouthpiece 20 is firmly (non-rotatably) attached to the open end portion 14.

As illustrated in FIGS. 1, 3, 5, and 7, screw grooves 28 are formed on the outer peripheral surface (outer surface) of each mouthpiece body 22 (the screw grooves 28 are omitted in FIGS. 2 and 4). It is configured that when the mouthpiece 20 is attached to the open end portion 14 (when the mouthpiece bodies 22 are connected to each other), a helical male screw portion 29 along the circumferential direction and the axial direction is formed by the screw grooves 28. A later-described female screw portion 19 of the fastening part 18 is screwed into the male screw portion 29.

Figure 8:
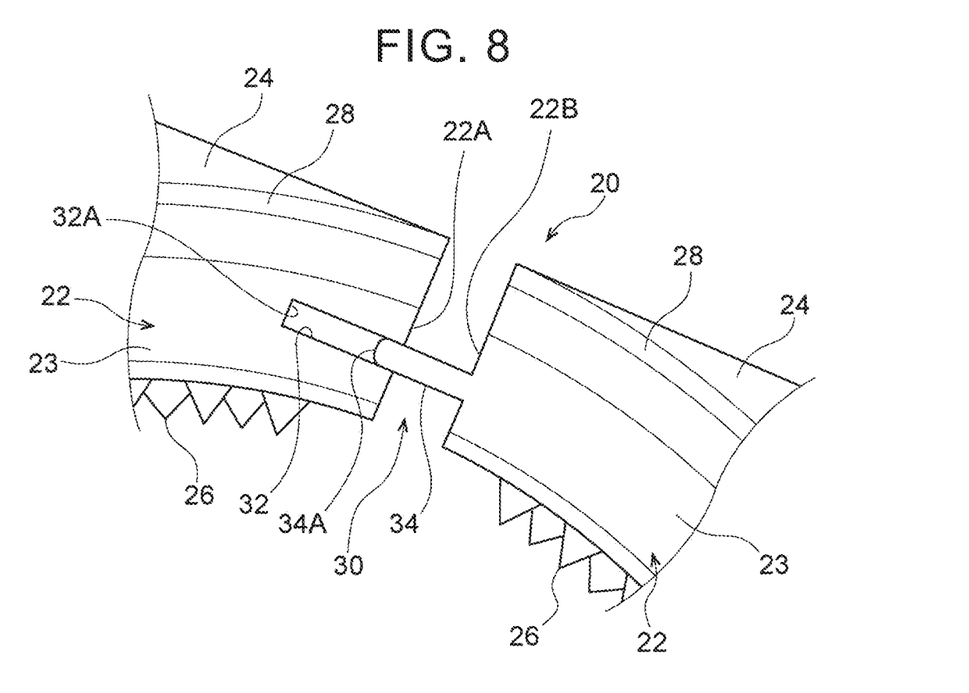
FIG. 8 is a front view illustrating, on an enlarged scale, a part of the mouthpiece in FIG. 7.
Figure 9:
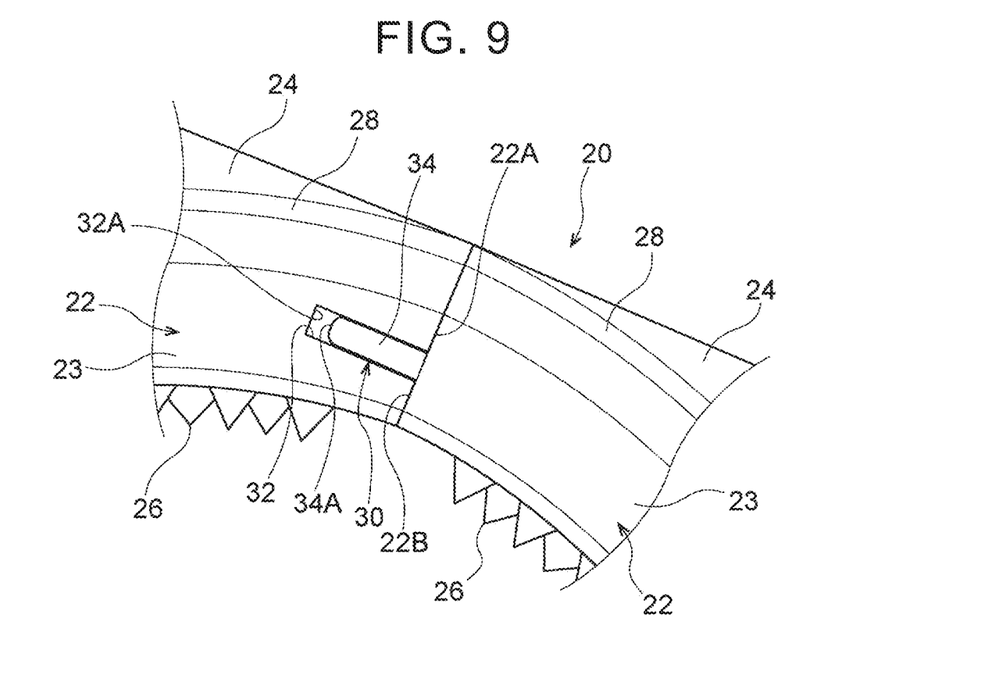
FIG. 9 is a front view, corresponding to FIG. 8, illustrating the mouthpiece after fitting according to the first embodiment.

As illustrated in FIGS. 7 to 9, fitting portions 30 for connecting the mouthpiece bodies 22 to each other in the circumferential direction are respectively formed at end portions of the mouthpiece bodies 22 in the circumferential direction. The fitting portion 30 includes a recessed portion 32 formed at a first end portion of each mouthpiece body 22 in the circumferential direction, and a protruding portion 34 formed at a second end portion of each mouthpiece body 22 in the circumferential direction.

More specifically, the recessed portion 32 is formed at a substantially radially middle portion of each mouthpiece body 22 at the first end portion, and is cut out into an elongated generally rectangular shape with its longitudinal direction along the circumferential direction as viewed from the axial direction. The length of the recessed portion 32 in the axial direction is the same as the length of the mouthpiece body 22 excluding the flange portion 24 in the axial direction.

The protruding portion 34 is formed at a substantially radially middle portion of each mouthpiece body 22 at the second end portion, and protrudes into an elongated generally rectangular shape with its longitudinal direction along the circumferential direction as viewed from the axial direction. The length of the protruding portion 34 in the axial direction is the same as the length of the mouthpiece body 22 excluding the flange portion 24 in the axial direction. A leading end surface 34A of the protruding portion 34 is an arc surface formed to an arc shape.

The mouthpiece bodies 22 are connected to each other in the circumferential direction by fitting the protruding portion 34 of one of the adjacent mouthpiece bodies 22 into the recessed portion 32 of the other of the adjacent mouthpiece bodies 22 so that the cylindrical mouthpiece 20 is formed. The depth (length) of the recessed portion 32 in the circumferential direction is set to be a little deeper (longer) than the protruding length of the protruding portion 34 in the circumferential direction. In other words, when the protruding portion 34 is fitted into the recessed portion 32, a gap is formed between a bottom surface 32A of the recessed portion 32 and the leading end surface 34A of the protruding portion 34 (see FIG. 9).

Therefore, it is configured that when the protruding portion 34 is fitted into the recessed portion 32, an end face 22A of one of the adjacent mouthpiece bodies 22 in the circumferential direction and an end face 22B of the other of the adjacent mouthpiece bodies 22 in the circumferential direction come in contact with each other. In other words, it is configured that a gap is not formed between the end face 22A of one of the adjacent mouthpiece bodies 22 in the circumferential direction and the end face 22B of the other of the adjacent mouthpiece bodies 22 in the circumferential direction.

Further, the width of the recessed portion 32 in the radial direction is set to be slightly smaller than the width of the protruding portion 34 in the radial direction (the width of the protruding portion 34 in the radial direction is set to be slightly greater than the width of the recessed portion 32 in the radial direction). Therefore, when the protruding portion 34 is fitted into the recessed portion 32, the protruding portion 34 is press-fitted into the recessed portion 32. Consequently, it is configured that even when a resin is impregnated into the reinforcing layer 16 by resin transfer molding (RTM), sealing is performed to prevent leakage of the resin from the radially inner side to the radially outer side of the mouthpiece 20.

Next, the operation of the pressure vessel 10 including the mouthpiece 20 according to the first embodiment configured as described above will be described.

Figure 3:
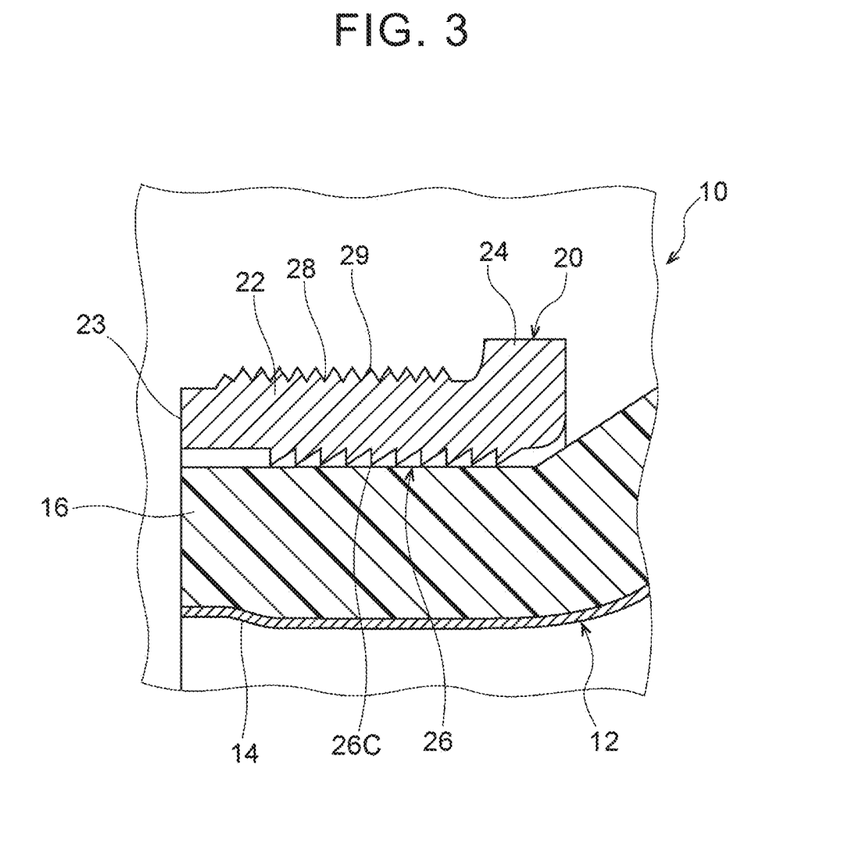
FIG. 3 is a sectional view taken along the line X-X in FIG. 2.

First, the process of attaching the mouthpiece 20 according to the first embodiment to the open end portion 14 of the liner 12 will be described. The eight mouthpiece bodies 22 are provisionally connected to each other by provisionally press-fitting the protruding portions 34 into the recessed portions 32, thereby forming the generally cylindrical mouthpiece 20. Then, as illustrated in FIGS. 2 and 3, the generally cylindrical mouthpiece 20 is disposed to be fitted on the outer peripheral side of the open end portion 14 of the liner 12 (the outer peripheral side of the reinforcing layer 16) (mouthpiece disposing process). Consequently, the tip portions 26C of the locking pawls 26 of the mouthpiece bodies 22 of the mouthpiece 20 are disposed in close proximity to the outer peripheral surface of the reinforcing layer 16 (with gaps therebetween).

Figure 5:
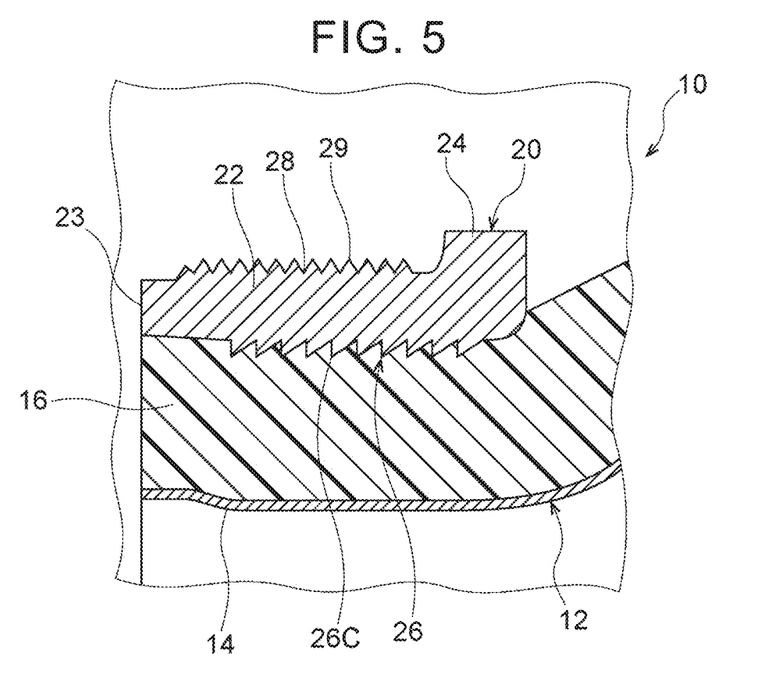
FIG. 5 is a sectional view taken along the line Y-Y in FIG. 4.

Then, as illustrated in FIGS. 4 and 5, the fitting portions 30 of the mouthpiece 20 are fitted together to reduce the diameter of the mouthpiece 20 (mouthpiece fitting process). That is, the protruding portions 34 provisionally press-fitted into the recessed portions 32 are press-fitted more deeply. Consequently, the mouthpiece bodies 22 are moved radially inward (reduced in diameter) so that the end face 22A of one of the adjacent mouthpiece bodies 22 and the end face 22B of the other of the adjacent mouthpiece bodies 22 come in contact with each other, resulting in that the locking pawls 26 bite into the reinforcing layer 16. In this way, the mouthpiece 20 is attached to the open end portion 14 of the liner 12 via the reinforcing layer 16.

Herein, a comparative example illustrated in FIG. 12 will be described. A mouthpiece 40 according to the comparative example has a structure that eight mouthpiece bodies 42 are connected to each other by thin plate-like connecting parts 44 each having its thickness direction along the radial direction and that the mouthpiece 40 is attached to the open end portion 14 of the liner 12 by locally deforming the connecting parts 44. With this structure, there is a possibility that the mouthpiece bodies 42 cannot be equally pressed radially inward due to variation of forces applied for such deformation or the like, resulting in the occurrence of a crack K or the like in one or some of the connecting parts 44.

On the other hand, the mouthpiece 20 according to this embodiment is configured by connecting the eight mouthpiece bodies 22 in the circumferential direction by the fitting portions 30. That is, in the mouthpiece 20, the mouthpiece bodies 22 are connected to each other by fitting together the fitting portions 30 formed at the end portions of the mouthpiece bodies 22 in the circumferential direction. Therefore, when attaching the mouthpiece 20 to the open end portion 14 of the liner 12, the portions connecting the mouthpiece bodies 22 to each other are not locally deformed. Consequently, it is possible to prevent the occurrence of a crack or the like in the portions connecting the mouthpiece bodies 22 to each other in the mouthpiece 20.

Further, the fitting portion 30 is formed by the recessed portion 32 formed at the first end portion of each mouthpiece body 22 in the circumferential direction, and the protruding portion 34 formed at the second end portion of each mouthpiece body 22 in the circumferential direction, and the mouthpiece bodies 22 of the mouthpiece 20 are connected to each other by fitting the protruding portion 34 of one of the adjacent mouthpiece bodies 22 into the recessed portion 32 of the other of the adjacent mouthpiece bodies 22. Therefore, the mouthpiece bodies 22 can be easily connected to each other.

Further, the protruding portion 34 is press-fitted into the recessed portion 32. Therefore, a gap in the radial direction is not formed between the recessed portion 32 and the protruding portion 34. Further, a gap is formed between the bottom surface 32A of the recessed portion 32 and the leading end surface 34A of the protruding portion 34. Therefore, the end face 22A of one of the adjacent mouthpiece bodies 22 in the circumferential direction and the end face 22B of the other of the adjacent mouthpiece bodies 22 in the circumferential direction firmly contact with each other so that a gap is not formed also between the end face 22A and the end face 22B.

In other words, if the leading end surface 34A of the protruding portion 34 abuts against the bottom surface 32A of the recessed portion 32, there is a possibility that contact between the end face 22A of one of the adjacent mouthpiece bodies 22 in the circumferential direction and the end face 22B of the other of the adjacent mouthpiece bodies 22 in the circumferential direction is impeded, resulting in that a gap is formed between the end face 22A and the end face 22B. Such a phenomenon does not occur in the mouthpiece 20 of this embodiment.

Therefore, compared to the configuration having radial gaps between the recessed portions 32 and the protruding portions 34 as viewed from the axial direction, or the configuration having gaps between the end faces 22A and the end faces 22B as viewed from the axial direction, it is possible to improve the sealability in the fitting portions 30. More specifically, even when a resin is impregnated into the reinforcing layer 16 by resin transfer molding (RTM), sealing can be performed to prevent leakage of the resin from the radially inner side to the radially outer side of the mouthpiece 20.

When the mouthpiece 20 is attached to the open end portion 14, the helical male screw portion 29 is formed by the screw grooves 28 formed on the outer peripheral portions of the mouthpiece bodies 22. Therefore, by screwing the helical female screw portion 19 of the fastening part 18 into the male screw portion 29, it is possible to attach the fastening part 18 to the open end portion 14 of the liner 12 (fastening part connecting process).

As described above, the mouthpiece 20 is configured such that the end face 22A of one of the adjacent mouthpiece bodies 22 and the end face 22B of the other of the adjacent mouthpiece bodies 22 are in contact with each other. Therefore, it is easy to perform dimension management of the inner diameter of the mouthpiece 20, and even when the open end portion 14 is reduced in diameter, the mouthpiece 20 is not reduced in diameter. Consequently, it is possible to prevent the occurrence of a failure such that the fastening part 18 screwed to the mouthpiece 20 is loosened and detached.

Second Embodiment

Next, the configuration of a mouthpiece 21 according to a second embodiment will be described. The same signs are given to the same portions as those of the mouthpiece 20 according to the first embodiment, thereby omitting a detailed description thereof as appropriate.

Figure 10:
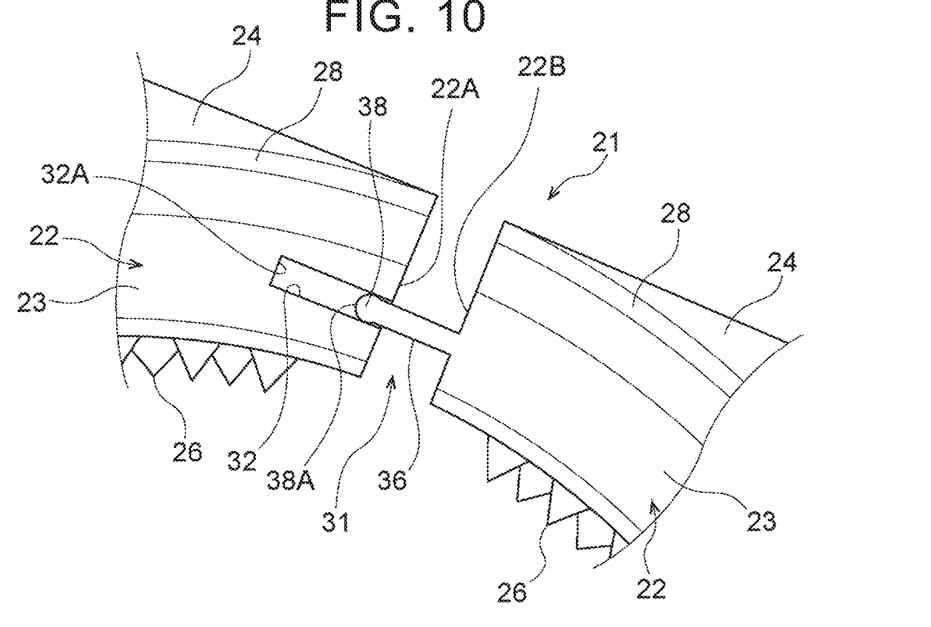
FIG. 10 is a front view illustrating, on an enlarged scale, a part of a mouthpiece before fitting according to a second embodiment.
Figure 11:
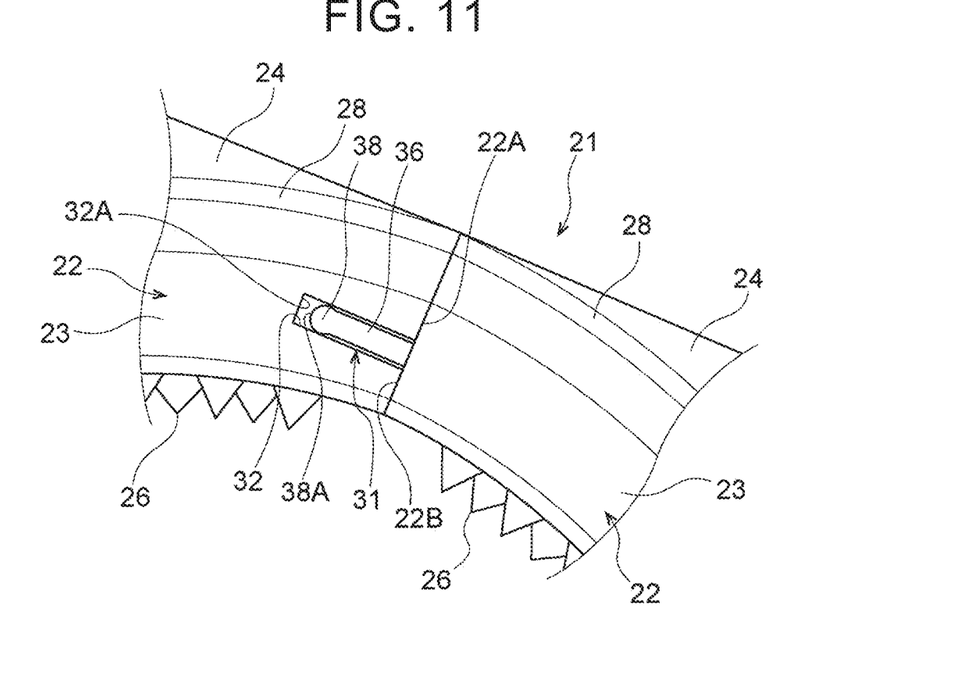
FIG. 11 is a front view, corresponding to FIG. 10, illustrating the mouthpiece after fitting according to the second embodiment.

As illustrated in FIGS. 10 and 11, a bulging portion 38 bulging in a generally circular shape as viewed from the axial direction is formed at a leading end portion of a protruding portion 36 (an end portion of the protruding portion 36 on the downstream side in the fitting direction of the protruding portion 36 to the recessed portion 32) forming a fitting portion 31 of the mouthpiece 21. The second embodiment differs from the first embodiment only in that the protruding portion 36 having the bulging portion 38 is provided.

As viewed from the axial direction, the diameter of the bulging portion 38 is set to be slightly greater than the width of the recessed portion 32 in the radial direction (the width of the recessed portion 32 in the radial direction is set to be slightly smaller than the diameter of the bulging portion 38). Therefore, the bulging portion 38 is configured to be press-fitted into the recessed portion 32. It is configured that a slight gap is formed in the radial direction between the protruding portion 36 excluding the bulging portion 38 and the recessed portion 32.

Next, the operation of the pressure vessel 10 including the mouthpiece 21 according to the second embodiment configured as described above will be described. With respect to the operation common to that of the first embodiment, a description thereof will be omitted as appropriate.

As illustrated in FIGS. 10 and 11, the bulging portion 38 of the protruding portion 36 is press-fitted into the recessed portion 32. Therefore, a gap in the radial direction is not formed between the recessed portion 32 and the bulging portion 38. Further, a gap is formed between the bottom surface 32A of the recessed portion 32 and a leading end surface 38A of the bulging portion 38. Therefore, like in the first embodiment, the end face 22A of one of the adjacent mouthpiece bodies 22 in the circumferential direction and the end face 22B of the other of the adjacent mouthpiece bodies 22 in the circumferential direction firmly contact with each other so that a gap is not formed also between the end face 22A and the end face 22B.

Therefore, compared to the configuration having radial gaps between the recessed portions 32 and the bulging portions 38 as viewed from the axial direction, or the configuration having gaps between the end faces 22A and the end faces 22B as viewed from the axial direction, it is possible to improve the sealability in the fitting portions 31. In particular, the leading end portion of the protruding portion 36 is formed as the bulging portion 38 bulging in the generally circular shape as viewed from the axial direction, and therefore, after the bulging portion 38 is press-fitted into the recessed portion 32, it is possible to constantly ensure the seal points in the radial direction against the recessed portion 32.

As described above, the slight gap is formed in the radial direction between the protruding portion 36 excluding the bulging portion 38 and the recessed portion 32. However, since the labyrinth structure is formed by the recessed portion 32 and the protruding portion 36, a reduction in the sealability is suppressed. When the leading end portion of the protruding portion 36 is formed as the bulging portion 38 bulging in the generally circular shape, there is an advantage that even when the protruding portion 36 is inserted obliquely into the recessed portion 32, the bulging portion 38 easily enters the recessed portion 32.

While the pressure vessel 10 according to this embodiment has been described with reference to the drawings, the pressure vessel 10 according to this embodiment is not limited to that illustrated in the figures and can be changed in design as appropriate within the scope not departing from the gist of the disclosure. For example, it is satisfactory if the liner 12 has the cylindrical open end portion 14 on at least one end side of the liner 12.

In the first embodiment, the leading end surface 34A of the protruding portion 34 is not necessarily the arc surface formed to the arc shape as viewed from the axial direction. However, when the leading end surface 34A of the protruding portion 34 is the arc surface, there is an advantage that the protruding portion 34 is allowed to easily enter the recessed portion 32.

In the second embodiment, the bulging portion 38 of the protruding portion 36 is not limited to the configuration in which it is formed to the generally circular shape as viewed from the axial direction. It is satisfactory if the bulging portion 38 bulges at least in the radial direction so as to ensure the sufficient sealability, and, for example, the leading end surface 38A of the bulging portion 38 may be formed as a flat surface.

The number of the mouthpiece bodies 22 forming the mouthpiece 20 is not limited to eight as illustrated. The number of the mouthpiece bodies 22 forming the mouthpiece 20 is changed in design as appropriate according to the outer diameter of the open end portion 14 (including the thickness of the reinforcing layer 16), the length of each mouthpiece body 22 in the circumferential direction, and so on.

The gas to be filled into the liner 12 is not limited to hydrogen. For example, a gas such as helium or nitrogen can alternatively be filled into the liner 12. The material of the reinforcing layer 16 is not limited to a carbon fiber reinforced resin (CFRP) as long as it is a fiber reinforced resin (FRP).

As long as it is configured that the end face 22A of one of the adjacent mouthpiece bodies 22 in the circumferential direction and the end face 22B of the other of the adjacent mouthpiece bodies 22 in the circumferential direction firmly contact with each other, a gap is not necessarily formed between the bottom surface 32A of the recessed portion 32 and the leading end surface 34A of the protruding portion 34 or the leading end surface 38A of the bulging portion 38.

What is claimed is:

1. A pressure vessel comprising:
   a vessel body including a cylindrical open end portion on at least one end side of the vessel body and configured to be filled with a gas;
   a covering part made of a fiber reinforced resin and covering an outer surface of the vessel body; and
   a cylindrical mouthpiece configured such that a plurality of mouthpiece bodies each having a projection on an inner surface of the mouthpiece body is connected to each other in a circumferential direction of the open end portion, the mouthpiece attached to an outer peripheral surface of the open end portion by the projections biting into the covering part covering the outer peripheral surface of the open end portion,
   wherein the mouthpiece bodies of the mouthpiece are connected to each other by fitting together fitting portions formed at end portions of the mouthpiece bodies in the circumferential direction.

2. The pressure vessel according to claim 1, wherein:
   the fitting portion comprises a recessed portion formed at a first end portion of each of the mouthpiece bodies in the circumferential direction, and a protruding portion formed at a second end portion of each of the mouthpiece bodies in the circumferential direction; and
   the mouthpiece bodies of the mouthpiece are connected to each other by fitting the protruding portion of one of the adjacent mouthpiece bodies to the recessed portion of the other of the adjacent mouthpiece bodies.

3. The pressure vessel according to claim 2, wherein the protruding portion is configured to be press-fitted into the recessed portion.

4. The pressure vessel according to claim 2, wherein:
   a bulging portion bulging at least in a radial direction of the open end portion is formed at an end portion of the protruding portion on a downstream side in a fitting direction of the protruding portion to the recessed portion; and
   the bulging portion is configured to be press-fitted into the recessed portion.

* * * * *